United States Patent [19]

Forrer et al.

[11] Patent Number: 4,514,246

[45] Date of Patent: Apr. 30, 1985

[54] METHOD OF CUTTING AND LABELING SHEET MATERIAL

[75] Inventors: Robert E. Forrer, Los Alamitos, Calif.; Robert A. Postier, Flagstaff, Ariz.

[73] Assignee: Gerber Garment Technology, Inc., South Windsor, Conn.

[21] Appl. No.: 438,926

[22] Filed: Nov. 3, 1982

[51] Int. Cl.³ .............................................. B32B 31/00

[52] U.S. Cl. ........................................ 156/264; 83/94; 156/285; 156/384; 156/510; 156/538; 156/556

[58] Field of Search ............... 156/285, 384, 510, 536, 156/556, 538, 264; 269/264; 83/409, 86, 649, 94

[56] References Cited

U.S. PATENT DOCUMENTS

| | | | |
|---|---|---|---|
| 3,495,492 | 2/1970 | Gerber et al. | 83/422 |
| 3,776,074 | 12/1973 | Pearl et al. | 83/563 |
| 3,893,881 | 7/1975 | Gerber et al. | 156/285 |
| 4,028,167 | 6/1977 | Gerber | 156/536 |
| 4,208,238 | 6/1980 | Augest et al. | 156/510 |

*Primary Examiner*—Jay H. Woo
*Assistant Examiner*—Timothy W. Heitbrink
*Attorney, Agent, or Firm*—McCormick, Paulding & Huber

[57] ABSTRACT

Transfer tables are selectively provided at opposite ends of one of several stationary work tables, and an automatic controller is programmed to cause a gantry to spread sheet material from a roll on one transfer table onto the work table and a cross carriage on the gantry has a label applicator to apply labels to predetermined areas of the sheet material during return movement of the gantry onto the one transfer table. Another transfer table has a conventional cutter which is programmed to cut the sheet material after it is so spread, and labeled, following which cutting step the cutter head and its carriage can be returned to said another transfer table. Both of these transfer tables can be moved on tracks from these positions adjacent the ends of the said work table to other work tables.

6 Claims, 6 Drawing Figures

METHOD OF CUTTING AND LABELING SHEET MATERIAL

BACKGROUND OF THE INVENTION

The present invention relates to automatically controlled cutting equipment of the type used to generate multiple pattern pieces from a layup of sheet material. More particularly, the present invention relates to improvements in the loading of the sheet material directly from a roll on a transfer table to the cutting table where the layup is formed, and the provision of label applicator means for attaching labels to the material after the sheet has been spread on the layup. This is accomplished automatically by a conventional computerized controller. A computer controlled cutting carriage is provided on a second transfer table at the opposite end of the layup table and has its own computerized controller.

In a conventional computer controlled cutting machine a support table is provided with a vacuum system to hold a layup of sheet material in position as a reciprocating cutting blade is lowered into cutting engagement with the material and translated along a line of cut defining the periphery of a pattern piece. After the periphery has been circumscribed by the cutting blade a stack of similarly shaped pieces is left on the table separated from the rest of the layup. The stack of cut pattern pieces is eventually moved from the cutting table in loose form, or the pieces may be tied or joined together as a bundle. Label applicators have been proposed for use with such an automatically controlled cutting machine and prior art U.S. Pat. No. 4,028,167 entitled "Label Applicator For Automatically Controlled Cutting Machine", having the same assignee as the present application, represents a prior approach to labeling stacks of pattern pieces in conjunction with such a machine all under the control of a single control means.

Because of the speed with which automatic cutting machines operate, the production process has been expedited with the provision of transfer tables which will permit transfer of the cutting carriage from and to a line of work tables where layups are prepared. Prior art U.S. Pat. No. 3,776,074 entitled "Transfer Apparatus For Automated Tool Carriage" also assigned to the assignee herein illustrates a prior art approach to transferring the cutting carriage from one fixed work table with its associated layup to another work table with another layup associated therewith, all under the control of a single controller.

The general object of the present invention is to provide a method and apparatus for automation of the process for forming the layup on the various work tables to which the transferable cutting carriage may be selectively directed. It is also an object of the present invention to provide a label applicator which operates in conjunction with the loader to apply labels to at least the uppermost pattern piece of each stack of each layup associated with each of these fixed work tables.

SUMMARY OF THE INVENTION

The present invention resides in a computer controlled cutting machine of the type having a carriage for moving a cutting tool in both the X and Y directions relative to a support table on which a layup of sheet material is provided. Movement of the cutting tool is controlled by computer means which causes the tool to follow a cutting path defining the periphery of pattern pieces as desired from the layup.

The cutting tool is preferably provided on a carriage which can be transferred from the work table to a transfer table at one end so as to be readily moved to another adjacent table and back to the table with the layup as required. A second transfer table is selectively positionable at the opposite end of the work table and includes means for storing a quantity of the sheet material to be loaded for forming the layup. It is an important feature of the present invention that a label applicator is provided on its own carriage and may be associated with this second transfer table or loader table. The label applicator carriage or a third carriage is adapted to pull the sheet material to be loaded from the storage means and to spread the material on the work table. Return motion of the same label applicator carriage is utilized to apply labels to appropriate positions on the layup such that each stack of pattern pieces, or each pattern piece itself, can be suitably labeled. This loader and label applicator carriage is controlled by separate computer. A cutoff device is provided adjacent the end of the table associated with the loader and label applicator so that each layup of sheet material can be severed after it has been spread on the work table and labeled in the manner described above.

DETAILED DESCRIPTION OF FIGS. 1–4

Figures 1, 2:
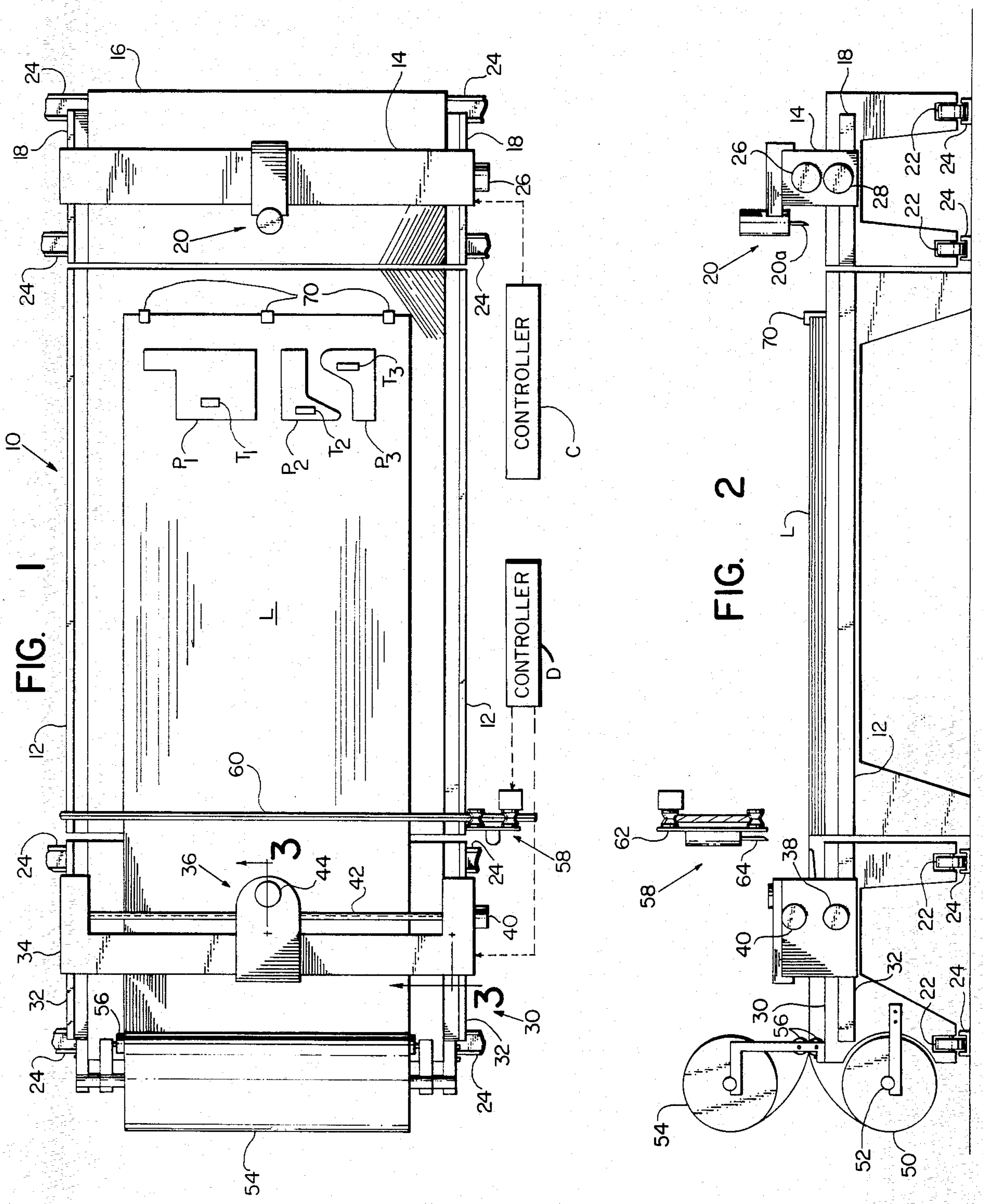
FIG. 1 is a plan view of an automatically controlled cutting machine including transfer tables at each end, one of which transfer tables is provided with a conventional computer controlled cutting tool and associated carriage structure, and the other of which transfer tables is provided with a loader and label applicator. This view also shows a means for severing each layer of sheet material used to form the layup on the work table.
FIG. 2 is a side elevational view of the apparatus illustrated in FIG. 1.

FIGS. 1 and 2 show a work table 10 of the type described in prior art patents such as those mentioned previously and of the type including a vacuum hold-down which may be employed to hold a layup of sheet material in position so that a reciprocating cutting blade can be translated along the line of cut in order to form stacks of pattern pieces such as those illustrated at P1, P2, and P3. For a more complete description of the work table 10 reference may be had to U.S. Pat. No. 3,495,492 entitled "Apparatus For Working On Sheet Material". Such a table includes longitudinally extending ways or racks 12, 12 which are adapted to be engaged by pinion gears (not shown) in the carriage structure 14 so that this carriage 14 can be driven from its position on a transfer table 16, where it is provided on short ways or racks 18, 18, onto rails 12, 12 associated with the table 10. Transfer table 16 provides a convenient storage facility for the carriage 14 and its associated cutting head 20. This table 16 is provided on casters or rollers 22, 22 so that the table 16 can be rolled from the position shown to a similar position associated with another work table (not shown) on the rails 24, 24. Clamps may be provided to lock transfer table 16 to work table 10. The reader is referred to U.S. Pat. No. 3,776,074 incorporated by reference herein for a more complete description of such a transfer table apparatus.

Thus, carriage 14 may be designated an X-carriage due to its movement in the X-coordinate direction over both the table 10 and the table 16 on ways or racks as mentioned above. An X drive motor 26 permits the carriage 14 to be driven in the X direction under the control of a computer controller C and the cutting head is provided on a Y-carriage 20 movable in the Y-coordinate direction by means of a lead screw (not shown) threadably engaged with the Y-carriage 20 and driven by Y drive motor 28. The cutter itself is indicated generally at 20*a* and is suspended above the surface of the table 10 and above the layup L when the carriage 14 is moved onto the work table 10. This cutting tool 20*a* is preferably of the reciprocating cutting blade type such that it can be lowered from its Y-carriage cutting head 20 into cutting engagement with the layup L at the beginning of the cutting operation so that it reciprocates along its own vertical axis and in cutting engagement with the sheet material comprising the layup itself. Thus, the carriages 14 and 20 are adapted to translate the blade along a cutting path defined by the periphery of the pattern pieces desired to be cut from the layup all under the control of a controller. This blade 20*a* is also adapted to be rotated about its own axis in order to be oriented generally tangent to the line of cut at each point along the periphery of the pattern pieces. When the cutting operation is complete the tool 20*a* is lifted out of engagement with the layup of sheet material and returned to the transfer table 16 as shown.

Prior art U.S. Pat. No. 3,776,074 shows and describes an apparatus for the automated transfer of X and Y carriages of the type described above from and to work tables in the manner outlined above. This patent also shows and describes means for aligning the walls 12 and 18 of the respective tables during transfer of the carriage and the disclosure in this patent is incorporated by reference herein for purposes of teaching a preferred form for the automated control of cutting head 20 as it moves from and to different work tables and movable transfer tables.

In further accordance with the present invention a second transfer table 30 is provided at the opposite end of the work table 10 and also is equipped with racks or ways 32, 32, which ways are alignable with those on the work table 10 so that a carriage or gantry means 34 can be moved lengthwise from the position shown on ways 32 associated with the table 30 onto the ways 12 associated with the work table 10. Gantry 34 is adapted to be driven from the controller D through drive motor 38. A second drive motor 40 is associated with a lead screw 42 to drive cross carriage 36 in the Y direction on X-carriage 34 in much the same manner as described previously with reference to the cutting head 20. Cross carriage 36 carries label applicator means 44 and the disclosure in prior art U.S. Pat. No. 4,028,167 is incorporated by reference herein as a prefered form for such an applicator. This label applicator 44 may also be capable of orienting labels by rotation in cross carriage 36. If desired this applicator 44 may also print the labels themselves and thereby provide for identification of individual pattern pieces within each ply of the layup L. Furthermore, applicator 44 may also be provided with means for blowing the individualized labels downwardly to provide for high speed label application. Moreover, the applicator 44 does not include a cutting tool on cross carriage 36 as taught in said U.S. Pat. No. 4,028,167 due to the fact that Y-carriage 20 described previously with reference to X-carriage 14 on the transfer table 16 serves the purpose of cutting out the material layed up on the work table 10 as shown at P1, P2 and P3 in FIG. 1. As shown in this view labels T1, T2, and T3 are applied to the stacked pattern pieces, or to each of the pattern pieces individually as required, by the label applicator 44. The applicator preferably includes dispensing means for applying information labels individually to the exposed surfaces of the sheet material within the peripheries of the pattern pieces P1, P2 and P3. These labels may be printed in the applicator itself and in such case the printer is also controlled by the controller as described in said patent.

In further accordance with the present invention means is provided for loading sheet material onto the work table 10 in order to permit individual sheets to be cut, or in order to permit a layup L of such sheets to be prepared so that a stack of pattern pieces can be cut with a single pass by the cutting tool 20*a*.

As best shown in FIG. 2, the workpiece sheet material is provided in the form of a roll 50, which roll is journalled on a shaft as indicated generally at 52, so that the cloth material to be cut can be drawn from the top of the roll 50 between rollers 56, 56 provided for this purpose on the table 30 and through the carriage 34 to be spread onto the top of work table 10, or on top of other plies previously spread on the table for purposes of preparing the layup L for cutting. A second roll 54 of impervious plastic sheet material may also be provided on top of the layup L, or on top one sheet, to be cut by the cutter 20*a*. Such a sheet may be to protect the upper surface of the workpiece material, or simply comprise a covering to improve the vacuum holddown characteristics of the work table 10. The plastic sheet also passes through a slot provided for this purpose in the carriage or gantry 34, and this gantry includes means for clamping the cloth so that movement of the gantry 34 from left to right in FIGS. 1 and 2 can achieve the movement of both the workpiece sheet material 50 and the plastic material 56 to spread these sheets over the work table 10 so that they can be cut. It will be apparent that the same carriage or gantry 34 which pulls the sheet materials across the top of work table 10 also carries the label applicator 44 such that the sheet material can be released when gantry 34 gets to the right hand end of table 10 and so that the various pattern pieces P1, P2 and P3 can be labeled as shown at T1, T2 and T3 respectively during return movement of the gantry from right to left. The second transfer table 30 is adapted to be moved from and to the position shown, at the left hand end of work table 10, by means of rollers or wheels 22, 22 in tracks 24, 24. Prior art U.S. Pat. No. 3,776,074 shows and describes an apparatus for the alignment of the ways 12 and 32 on these tables 10 and 30 so that transfer table 30 can service several work tables 10.

Figure 3:
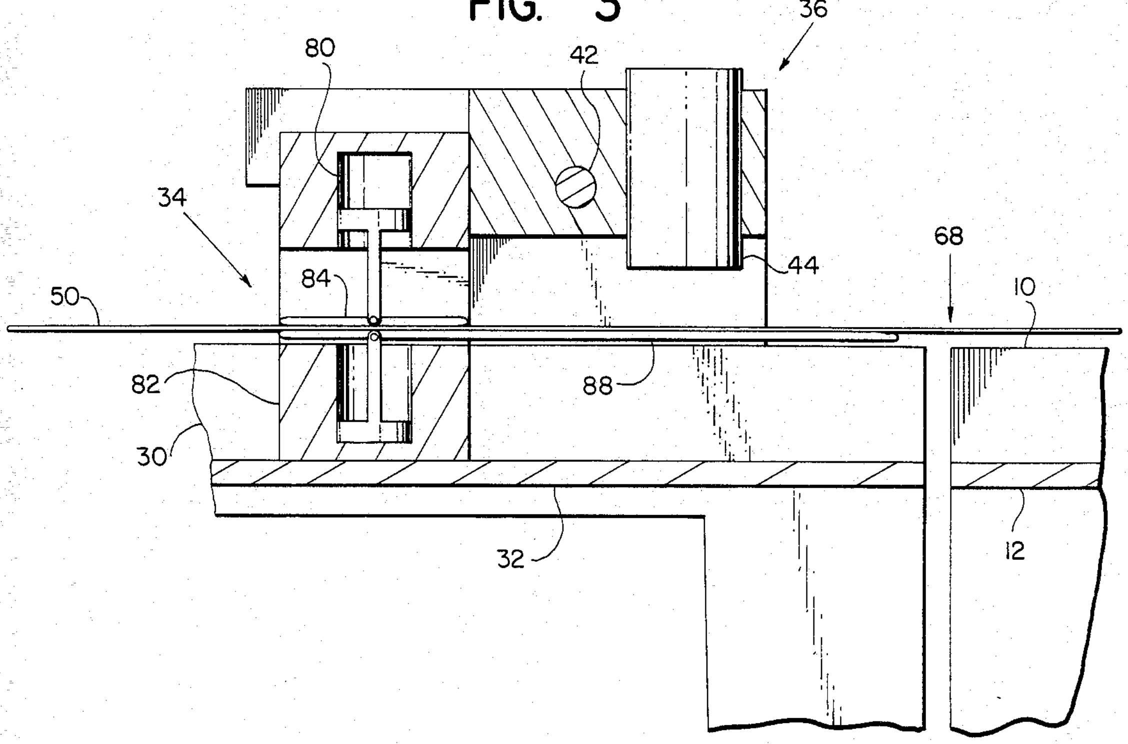
FIG. 3 is a vertical sectional view taken on the line 3—3 of FIG. 1.
Figure 4:
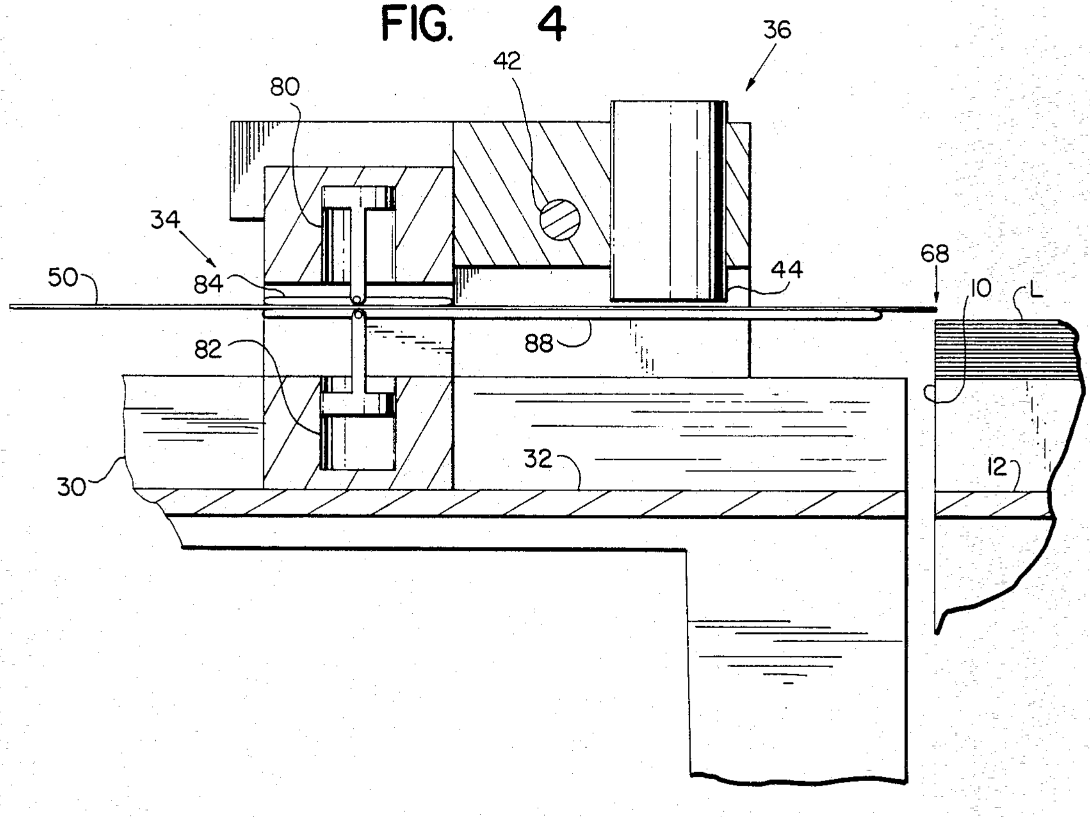
FIG. 4 is a view similar to FIG. 3 but at a different time during the cycle of operation of the machine.

Still with reference to the transfer table 30, FIGS. 3 and 4 show clamping one or both of the sheets 50 so that these sheets can be unrolled and spread on the table 10 for the purpose described above. Reciprocating fluid actuators, 80 and 82 have laterally extending shoes, 84 and 88 respectively, so arranged as to selectively clamp the sheet 50 therebetween. The lower shoe 88 is elongated to support the sheet following return movement of the gantry 34 and while the sheet is cut, at 68 by device 58 to be described. During return motion of the gantry 34, to reassume the position shown for it in FIGS. 1 and 2 these sheet materials are released so that the gantry 34 can return and so that the cross carriage 36 with its applicator can traverse the layup for purposes of the labeling process, which process is again under the control of the controller D.

FIG. 3 shows sheet 50 after it is spread on table 10 and prior to being cut at 68. Once the sheet has been so cut, and especially if the layup L has been built up to the FIG. 4 condition, actuators 80 and 82 can be configured as shown in FIG. 4. Sheet 50 can then be moved toward the right to place another ply on the layup L. As best shown in FIGS. 1 and 2 one or more holding devices 70, 70 are provided at the right hand end of table 10 to hold this top ply until gantry 34 is returned to the FIG. 4 position so that cutting device 58 severs the sheet at 68. Pressure in the fluid actuators must be released to allow return movement of the gantry 34.

Upon return to the "start" position shown in FIGS. 1 and 2 the sheet materials 50 and 54 adjacent the left hand end of table 10, and a vertically movable cutting device 58 is provided above the left hand end of table 10 for this purpose. A laterally extending rail 60 is adapted to slidably support a cross carriage 62 having a vertically reciprocable cutting blade 64 which can be lowered so that movement of carriage 62 laterally across the end of table 10 serves to cut these sheet materials adjacent the left hand end of the layup L.

Following this sheet severing step the clamping devices 84 and 88 clamp the sheet material 50 (and 54 if required) at a predetermined location and a second layer of one or both materials is pulled across the top of the layup L as required to complete or to form the layup. The means for clamping the sheets 50 and 54 may also comprise any other convenient form of sheet clamping device, as for example a pivoted bar driven toward and away from a bar underneath the sheets by solenoid operated devices under the control of controller D. As shown in FIGS. 3 and 4 the means for clamping these sheets comprises solenoid controlled valves (not shown) to operate opposed pairs of fluid actuators 80 and 82, two being provided at opposite ends of the upper portion of gantry 34, and the other pair in the lower portion thereof (as shown in these views only one of each pair is depicted but it will be understood that two of each are provided at opposite ends of the gantry 34).

Although FIGS. 1–4 show an automated apparatus with little need for operator intervention, except through the controllers C and D, less sophisticated versions of the above described apparatus will readily occur to those skilled in the art. One such less automated version might include a joy stick type control for slewing the loader/applicator carriage to a predetermined reference position on table 10, following which controller C will automatically apply appropriate labels as required.

DETAILED DESCRIPTION OF FIGS. 5 AND 6

Figure 5:
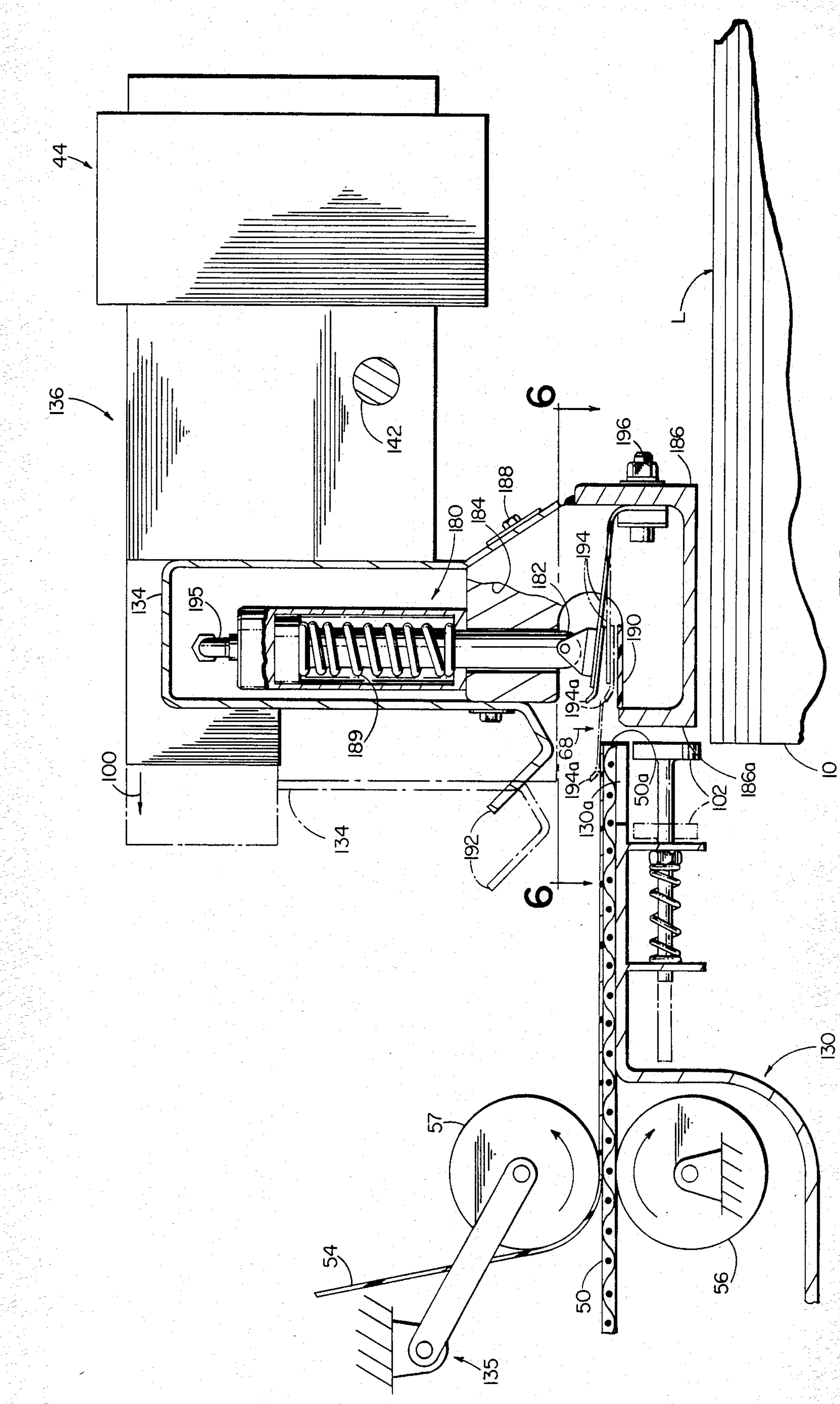
FIG. 5 is a vertical sectional view of an alternative form for the sheet loader and label applicator at the end of a work table.

The FIG. 5 embodiment of the sheet clamping means is mounted on a gantry 134 which is similar to that described above with reference to gantry 34. A cross carriage 136 moves in the Y direction as a result of rotation of lead screw 142, and a label applying device 44 is adapted to label the sheet material after it has been spread on the table 10 and during return movement of the gantry 134 to pick up a succeeding ply of workpiece sheet material 50 and plastic sheet.

The clamping device of FIG. 5 is especially suitable for spreading relatively stiff uncured composite sheet material such as is currently used in the aerospace industry to form structural members after the pattern pieces have been cut and removed from the table 10 to be molded and cured to some predetermined shape. Such sheet material may be fed from a roll, such as that shown at 50, with plastic sheet material mated therewith from a second roll, such as shown at 54. Rollers 56 and 57 compress the two sheets and they are both clamped in the device of FIG. 5 as follows. Roller 57 is gravity biased downwardly and roller 56 is journalled in table 130 as mentioned above with reference to FIGS. 1 and 2.

Sheet 50, with or without sheet 54 will have been severed adjacent the end of table 10 (see the arrow 68 in FIG. 5) and gantry 134 is moved toward the left as shown at 100 in FIG. 5 until the left hand portion **186*a* of channel member 186 is stopped by a spring biased plunger 102 mounted in the table 130** for this purpose.

Table 130 has its right hand end portion defining spaced rectangular notches, as shown in FIG. 5, and the portion **186*a* of channel 186 is of complementary contour to permit this movement of gantry 134 (see broken line limit for such leftward movement of gantry 134). This notched table and gantry geometry facilitates clamping of the sheet end portion 50*a* between a resilient spring member 194 and an elastomeric anvil 190 in the gantry. In the solid line position shown for member 194 a relatively wide space is provided to receive the sheet (or sheets). One end of member 194 is secured to a flange of channel member 186 as shown at 196. The free end portion of member 194 has a corrugated lower surface as shown at 194*a* to securely clamp these sheets 50 (and 54) when actuators 180 (one shown) are extended in response to fluid pressure in a manifold line 195 (see broken line position of member 194 in FIG. 5**).

Structurally, the clamping means of FIG. 5 comprises an inverted U-shaped housing 151 of the gantry 134 in which the actuators 180 are mounted on brackets 184 (one shown). Screws 188, 188 secure these brackets 184 to the depending legs of the housing 134, and the lower channel member 186 cooperates with a skirt portion 192 of this housing to define a laterally extending opening for receiving the sheet 50.

The side-by-side fluid actuators 180 have movable portions 182 connected to the sheet clamping member 194 and as shown each actuator is fluid operated under the control of a solenoid valve (not shown) to clamp the sheet or sheets. Internal return springs 189 urge this member 194 toward the open position shown.

Figure 6:
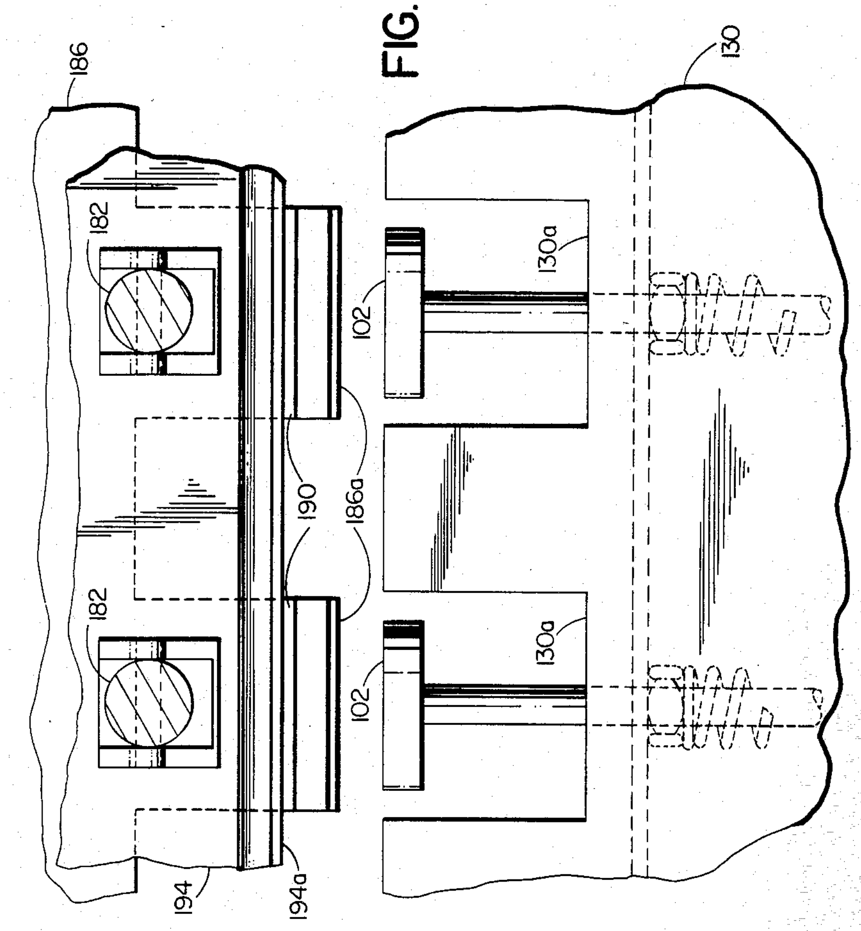
FIG. 6 is a horizontal sectional view with portions broken away to show the complementary edge portions of the applicator and its transfer table, being taken on the line 6—6 of FIG. 5.

Transfer table 130 includes means 135 for mounting roll 57 in gravity biased relationship to the roller 56. As best shown in FIG. 6 the horizontally extending sheet supporting portion of table 130 has a free edge which defines the notches **130*a*, 130*a*. The stop plungers 102, 102 are provided with their abutment ends in these notches as shown. Movement of the gantry toward these notches will cause the projecting portions 186*a*, 186*a* of the member 186 in the gantry to move these plungers so that the free edge of the sheet material (not shown in FIG. 6) can be clamped between the anvil 190**

(or more correctly the anvil segments defined on the portions 186*a*, 186*a*) and the sheet clamping member 194. This member 194 may extend the full width of the gantry (or it too may be segmented to correspond with the portions 186*a*, 186*a*). The fluid operated actuators 180, 180 have movable portions 182, 182 connected to the member 194 by U-shaped brackets as shown.

As so constructed and arranged the gantry 134 of FIG. 5 is equipped to clamp the free end of the sheet 50 (as indicated by the cutting blade path reference numeral 68 in FIG. 5) and to spread the sheet onto the work table 10. Upon reaching a predetermined position (such as that defined by the devices 70, 70 in the previously described embodiment). The version of FIGS. 5 and 6 does not, however require that these devices 70, 70 hold the layup as in the earlier version. The gantry can be slewed to a reference position for this purpose. Once the sheet is released, further motion of the gantry in the same direction will allow the free end of the sheet to drop down into precisely the right position and free the gantry for return movement to first accomplish the labelling step by applicator 44, and then to pick up a second sheet as required. During the labelling operation the operator will manually cut off the sheet at 68 as described above, or the controller D will accomplish this intermediate step in a fully automated mode of operation.

We claim:

1. A method for spreading sheet material on a support surface of a cutting table between opposite first and second ends of said cutting table and applying labels to said sheet material in preparation for cutting a plurality of pattern pieces from said sheet material with each piece bearing an identifying label comprising at least the following steps:

providing at the first end of the cutting table a spreading and labeling carriage that is movable over the support surface of said cutting table under automatic control;

clamping a ply of sheet material adjacent a free end thereof to the spreading and labeling carriage while said carriage is located adjacent the first end of the cutting table and the sheet material is located off of said cutting table;

moving the spreading and labeling carriage over the support surface from said first end of said cutting table toward said second end and drawing the clamped sheet material onto the support surface to spread the sheet material on said cutting table;

releasing the clamped free end of the sheet material from the spreading and labeling carriage after said sheet material has been so spread;

controllably returning the spreading and labeling carriage back to the first end of the table after releasing the material spread on the support surface; and applying labels from the spreading and labeling carriage to the areas of the spread sheet material from which pattern pieces are to be cut during the return movement of the spreading and labeling carriage to the first end of the table.

2. The method of claim 1 further characterized by providing a roll of sheet material adjacent the first end of said cutting table, the step of clamping comprising clamping the free end of the sheet material in the roll to the spreading and labelling carriage, and unrolling said sheet material from the roll onto the support surface to so spread the material during the step of moving the carriage from said first end.

3. The method of claim 2 further characterized by severing said sheet material from the roll after it has been so spread.

4. The method of claim 3 further characterized by providing a roll of plastic air impervious sheet adjacent said sheet material prior to said clamping step for spreading with the sheet material, and said spreading and labelling carriage serves to mark said plastic air impervious sheet when in position on top of the sheet material.

5. The method of claim 1 further characterized by repeating said steps of clamping, moving, releasing, returning, and applying to spread another ply of sheet material on top of the previously spread ply and generate a multi-ply layup of sheet material for cutting with labels on each ply.

6. The method of claim 1 further including the steps of providing at the second end of said cutting table opposite the first end a cutting carriage for cutting pattern pieces from the sheet material spread on the support surface of said cutting table under automatic control; and controllably moving the cutting carriage over the support surface of said cutting table in cutting engagement with the spread sheet material after the step of returning the spreading and labelling carriage to the first end of the table.

* * * * *